(12) United States Patent
Haralur et al.

(10) Patent No.: US 8,274,744 B2
(45) Date of Patent: Sep. 25, 2012

(54) POLYIMIDE OPTICAL ARTICLE

(75) Inventors: Gurulingamurthy Haralur, Evansville, IN (US); Kapil Sheth, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 12/948,786

(22) Filed: Nov. 18, 2010

(65) Prior Publication Data

US 2012/0127565 A1 May 24, 2012

(51) Int. Cl.
*G02B 3/00* (2006.01)
*G02B 7/00* (2006.01)

(52) U.S. Cl. ............ 359/642; 264/176.1; 264/219; 359/109; 428/411.1; 428/412; 528/196; 528/198

(58) Field of Classification Search .......... 264/176.1, 264/219; 359/109, 642; 428/411.1, 412; 528/196, 198
See application file for complete search history.

(56) References Cited

U.S. PATENT DOCUMENTS

| | | | |
|---|---|---|---|
| 6,100,371 A | 8/2000 | Suh et al. | |
| 6,807,336 B2 | 10/2004 | Van Haasteren | |
| 7,206,140 B2 | 4/2007 | Wong et al. | |
| 7,329,054 B1 | 2/2008 | Epitaux et al. | |
| 7,457,343 B2 | 11/2008 | Vancoille | |
| 7,572,069 B2 | 8/2009 | Teo et al. | |
| 2005/0065278 A1 | 3/2005 | Mercado et al. | |

FOREIGN PATENT DOCUMENTS

EP 1237015 A1 9/2002

OTHER PUBLICATIONS

International Search Report; International Application No. PCT/US2011/061350; Filing Date: Nov. 18, 2011; Date of Mailing: Feb. 21, 2012; 4 Pages.
Written Opinion of the International Searching Authority; International Application No. PCT/US2011/061350; Filing Date: Nov. 18, 2011; Date of Mailing: Feb. 21, 2012; 7 Pages.

*Primary Examiner* — Terressa Boykin
(74) *Attorney, Agent, or Firm* — Cantor Colburn LLP; Diderico van Eyl

(57) ABSTRACT

Disclosed herein is an article comprising a lens having a width of 0.1 millimeters to 100 millimeters, a length of 0.5 millimeters to 500 millimeters, and a thickness of 0.2 millimeters to 5 millimeters; and the lens transmits light having a wavelength of 600 nanometers to 1600 nanometers, wherein the lens comprises a polymer and the polymer comprises a polyimide comprising structural units derived from specific combinations of compounds wherein the lens is transparent and dimensionally stable at a wall thickness of 0.2 millimeters to 5.0 millimeters and remains transparent and dimensionally stable after being (a) exposed to a precondition of 60° C./60% relative humidity for 120 hours and (b) then subjected to a lead free solder test having a peak temperature of 260° C. for up to 30 seconds.

22 Claims, No Drawings

POLYIMIDE OPTICAL ARTICLE

BACKGROUND

Optical articles comprising a polyimide are disclosed herein.

Fiber optic technology has been traditionally used for long distance communication but with increases in internet usage for large amounts of data transfer, much of the bandwidth in the existing optical network is used for this data communication and at higher rates. Increasingly fiber optics is being used to connect computer networks to meet the huge demand of data and at higher data transfer speeds, even at shorter distances.

Optical connectors or transceivers are components of optical networks, which are used to connect servers, where in the transceivers function to convert light into electrical signals and electrical signals back into light signals. The optics in these devices, termed as optical sub assemblies (OSA) is currently made out of a polyetherimide, which acts as lens and optics housing assembly. These transceivers are pluggable and stand alone components.

It is increasingly desirable to move from pluggable transceivers to an on board transceivers system and to use optical waveguides or light pipes on a backplane to connect boards and waveguides on printed circuit boards as busses to increase the data transfer rates. These applications require high glass transition temperature polymers.

These devices require injection molded polymer micro lenses and waveguides, since that fabrication process is well suited for manufacturing at high volumes and low cost. The lenses are required to retain their shape at temperatures in excess of 240° C., since laser transmitter/transceiver modules are exposed to high temperatures during their placement on printed circuit boards by a solder re-flow process or a solder bath, especially lead free solder processes. For this reason, only polymers with high glass transition temperatures can be used. In addition, as these lens or waveguides perform the function of light path between laser diodes, photo detectors and fiber optics, these polymers have to be clean, transparent with high transmission, specifically in the range of 600 nm to 1600 nanometers (nm), which are typical communication wavelength used in optical communication and be able to retain the optical characteristics and be dimensionally stable after exposure to humidity.

Hence there exists an unmet need for optical articles comprising a polymer with high transmission in the range of 600 nm to 1600 nm, dimensional stability even after exposure to humidity and capable of withstanding lead free solder processes.

BRIEF SUMMARY

Disclosed herein is an article comprising a lens having a width of 0.1 millimeters to 100 millimeters, a length of 0.5 millimeters to 500 millimeters, and a thickness of 0.2 millimeters to 5 millimeters; and the lens transmits light having a wavelength of 600 nanometers to 1600 nanometers, wherein the lens comprises a polymer and the polymer comprises:
 a polyimide comprising structural units derived from
  (A) a dianhydride/diamine pair wherein the pair comprises
   (i) oxydiphthalic anhydride and diaminodiphenylsulfone, or
   (ii) a dianhydride selected from the group consisting of oxydiphthalic anhydride, 3,3, bisphenol A dianhydride, 4,4, bisphenol A dianhydride, and combinations of the foregoing dianhydrides and a diamine selected from the group consisting of meta-phenylenediamine, para-phenylenediamine, diaminodiphenyl sulfone, oxydianiline, and combinations of the foregoing diamines,
  (B) a chloro-substituted phthalic anhydride, a diamine selected from the group of meta-phenylenediamine, para-phenylenediamine, diaminodiphenyl sulfone, oxydianiline and combinations thereof, and a dihydroxy phenol salt; or
  (C) a combination of (A) and (B); and
wherein the lens is transparent and dimensionally stable at a wall thickness of 0.2 millimeters to 5.0 millimeters and remains transparent and dimensionally stable after being (a) exposed to a precondition of 60° C./60% relative humidity for 120 hours and (b) then subjected to a lead free solder test having a peak temperature of 260° C. for up to 30 seconds.

DETAILED DESCRIPTION

Disclosed herein is an article comprising lens. The lens has a width of 0.1 millimeters to 100 millimeters, a length of 0.5 millimeters to 500 millimeters, and a thickness of 0.2 millimeters to 5 millimeters; and transmits light having a wavelength of 600 nanometers to 1600 nanometers. Within this range the lens can specifically transmit light having a wavelength of 1310 nanometers. Also within this range the lens can specifically transmit light having a wavelength of 1550 nanometers. Also within this range the lens can specifically transmit light having a wavelength of 850 nanometers.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

The terms "first," "second," and the like, "primary," "secondary," and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

The term "alkyl" is intended to include both $C_{1-30}$ branched and straight-chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" is intended to mean an aromatic moiety containing the specified number of carbon atoms, such as, but not limited to phenyl, tropone, indanyl or naphthyl.

The term "transparency" means an article of the invention has a transmission of at least 30% at 3.2 mm thickness at a wavelength ranging from 600 to 1600 nm, where "thickness" refers to the thickness of an article such as a lens.

The term "dimensionally stable" means that an article of this invention exhibits a surface appearance that does not exhibit any cracks (popcorning effect), as defined by J-STD-020-C (2004).

The lens is transparent and dimensionally stable at a wall thickness of 0.2 millimeters to 5 millimeters and remains transparent and dimensionally stable after being (a) exposed to a precondition of 60° C./60% relative humidity for 120 hours and (b) then subjected to a lead free solder test having a peak temperature of 260° C. for up to 30 seconds. The lens comprises a polymer which comprises a polyimide as described below. The lens can consist of a polyimide or combination polyimides as described below.

The lens can be transparent and dimensionally stable at a wall thickness of 0.2 millimeters to 5.0 millimeters after being (a) exposed to a precondition of 85° C./85% relative humidity for 120 hours and (b) subjected to a lead free solder test for 30 seconds at 260° C.

The lens can have a transparency that is greater than or equal to 40% at a thickness of 2 millimeters.

The polyimide comprises structural units derived from (A) a dianhydride/diamine pair comprising (i) oxydiphthalic anhydride and diaminodiphenylsulfone or (ii) a dianhydride selected from the group consisting of oxydiphthalic anhydride, 3,3, bisphenol A dianhydride, 4,4, bisphenol A dianhydride, and combinations of the foregoing dianhydrides and a diamine selected from the group consisting of meta-phenylenediamine, para-phenylenediamine, diaminodiphenyl sulfone, oxydianiline, and combinations of the foregoing diamines; (B) a chloro-substituted phthalic anhydride, a diamine selected from the group of meta-phenylenediamine, para-phenylenediamine, diaminodiphenyl sulfone, oxydianiline and combinations thereof, and a dihydroxy phenol salt; or (C) a combination of (A) and (B).

The polyimide can consist of structural units derived from (A) a dianhydride/diamine pair comprising (i) oxydiphthalic anhydride and diaminodiphenylsulfone or (ii) a dianhydride selected from the group consisting of oxydiphthalic anhydride, 3,3, bisphenol A dianhydride, 4,4, bisphenol A dianhydride, and combinations of the foregoing dianhydrides and a diamine selected from the group consisting of meta-phenylenediamine, para-phenylenediamine, diaminodiphenyl sulfone, oxydianiline, and combinations of the foregoing diamines; (B) a chloro-substituted phthalic anhydride, a diamine selected from the group of meta-phenylenediamine, para-phenylenediamine, diaminodiphenyl sulfone, oxydianiline and combinations thereof, and a dihydroxy phenol salt; or (C) a combination of (A) and (B).

Structural units derived from oxydiphthalic anhydride and diaminodiphenylsulfone have the formula

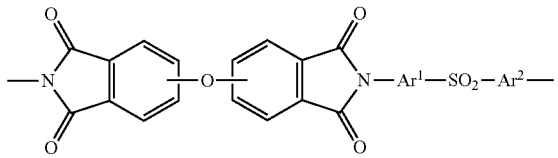

wherein $Ar^1$ and $Ar^2$ are phenyl groups.

Structural units derived from a dianhydride selected from the group consisting of oxydiphthalic anhydride, 3,3, bisphenol A dianhydride, 4,4, bisphenol A dianhydride, and a diamine selected from the group consisting of meta-phenylenediamine, para-phenylenediamine, diaminodiphenyl sulfone, oxydianiline have the formula

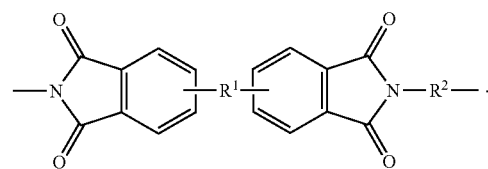

$R^1$ can be an oxy group or can have one of the following structures

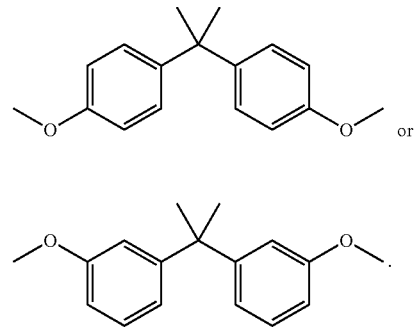

$R^2$ can have one of the following structures

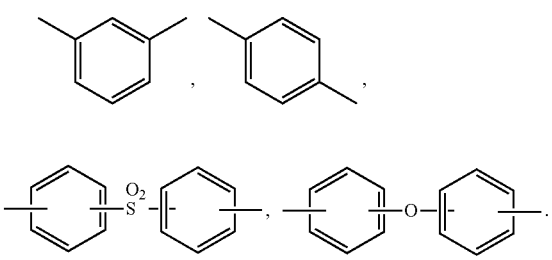

Structural units derived from a chloro-substituted phthalic anhydride, a diamine selected from the group of meta-phenylenediamine, para-phenylenediamine, diaminodiphenyl sulfone, oxydianiline and combinations thereof, and a dihydroxy phenol salt have the formula

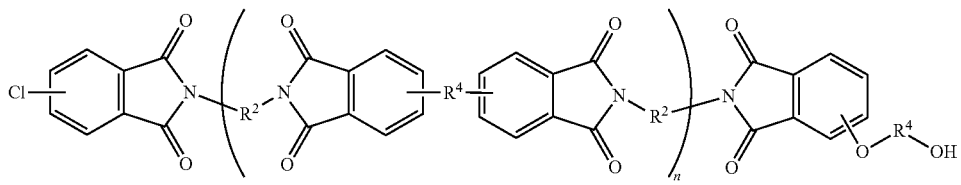

wherein $R^2$ is defined as above and $R^4$ is derived from a dihydroxy phenol. Suitable dihydroxy phenols include those having the formula

OH-A²-OH wherein $A^2$ is a divalent aromatic hydrocarbon radical, such as

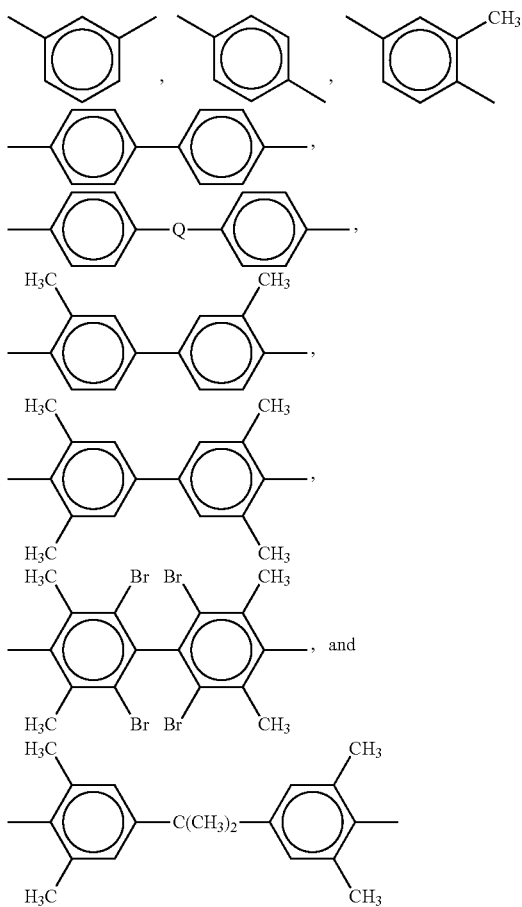

wherein Q includes but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

The lens can comprise two polyimide polymers that form a non-delaminated blend. The term "non-delaminated" refers to the property of a composition or an article derived from the composition, in which the article or the composition does not exhibit visually observed separation of a surface layer showing a flaking or onion skin effect. A non-delaminated article may also be referred to herein as "essentially free from delamination."

The first polyimide can be present in an amount of 50 to 99 weight percent; the second polyimide can be present in an amount of 1 to 50 weight percent; and the thermoplastic composition can further comprise 0 to 70 weight percent of a component selected from the group consisting of fillers, reinforcements, additives, and combinations thereof; wherein the first polyimide, the second polyimide, and the component are present at a total weight percent of 100, as long as a lens made from the composition is transparent and dimensionally stable at a wall thickness of at least 0.2 millimeters to 5.0 millimeters and remains transparent and dimensionally stable after being (a) exposed to a precondition of 60° C./60% relative humidity for 120 hours and (b) then subjected to a lead free solder test having a peak temperature of 260° C. for up to 30 seconds.

When the lens comprises two polyimides the first polyimide polymer can comprise structural units derived from oxydiphthalic anhydride and diaminodiphenyl sulfone; and the second polyimide polymer can comprise structural units derived from a dianhydride/diamine pair selected from the group consisting of (i) 3,3 bisphenol dianhydride and diaminodiphenyl sulfone, (ii) 4,4, bisphenol A dianhydride and metaphenylene diamine, (iii) 4,4, bisphenol A dianhydride and para-phenylenediamine, (iv) 4,4 bisphenol dianhydride and diaminodiphenyl sulfone, and (v) combinations of the dianhydride/diamine pairs (ii)-(iv).

Alternatively, the lens comprises two polyimides the first polyimide polymer can comprise structural units derived from 3,3 bisphenol dianhydride and diaminodiphenyl sulfone; and the second polyimide polymer can comprise structural units derived from a dianhydride/diamine pair selected from the group consisting of (i) 4,4, bisphenol A dianhydride and metaphenylene diamine, (ii) 4,4, bisphenol A dianhydride and para-phenylenediamine, (iii) 4,4 bisphenol dianhydride and diaminodiphenyl sulfone, and (iv) combinations of the dianhydride/diamine pairs (i)-(iii).

It is also contemplated that the lens can further comprise a polymer other than a polyimide. The non-polyimide polymer can be selected from the group consisting of polyesters, polyestercarbonates, polysulfones, polyether sulfones, polybenzimidizole, polyketones, and combinations of the foregoing polymers, as long as a lens made from the blend of polymers is transparent and dimensionally stable at a wall thickness of at least 0.2 millimeters to 5.0 millimeters and remains transparent and dimensionally stable after being (a) exposed to a precondition of 60° C./60% relative humidity for 120 hours and (b) then subjected to a lead free solder test having a peak temperature of 260° C. for up to 30 seconds. In one embodiment, the composition comprises a polyketone and the polyketone is present in an amount less than 20 weight percent, based on the weight of the composition.

The polymer or polymer blend can have a coefficient of thermal expansion of less than or equal to 100 ppm/° C. from 30° C. to 200° C. as measured by thermal mechanical analysis with a thermal ramp rate of 5° C./minute. (as per ASTM E 831-06)

The polymer or polymer blend can have a continuous use temperature greater than or equal to 150° C.

Also disclosed herein is an comprising a concave lens comprising a polymer wherein the lens has a width of 0.1 millimeter to 10 millimeter, a length of 0.1 millimeter to 50 millimeters, and a thickness of 0.2 millimeter to 5 millimeter; wherein the lens transmits light having a wavelength of 850 nanometers to 1550 nanometers wherein the polymer comprises a polyimide comprising structural units derived from (A) a dianhydride/diamine pair wherein the pair comprises
  (i) oxydiphthalic anhydride and diaminodiphenylsulfone,
  (ii) a dianhydride selected from the group consisting of oxydiphthalic anhydride, 3,3, bisphenol A dianhydride, 4,4, bisphenol A dianhydride, and combinations of the foregoing dianhydrides and a diamine selected from the group consisting of meta-phenylenediamine, para-phenylenediamine, diaminodiphenyl sulfone, oxydianiline, and combinations of the foregoing diamines, (B) a chloro-substituted phthalic anhydride, a diamine selected from the group consisting of meta-phenylenediamine, para-phenylenediamine, diaminodiphenyl sulfone, oxydianiline, dihydroxy phenol salts, and combinations thereof; or (C) a combination of (A) and (B); and wherein the lens is transparent and dimensionally stable at a wall thickness of at least 0.2 millimeters to 5.0 millimeters and remains transparent and dimensionally stable after being (a) exposed to a precondition of 60° C./60% relative humidity for 120 hours and (b) then subjected to a lead free solder test having a peak temperature of 260° C. for up to 30 seconds.

The following examples are included to provide additional guidance to those skilled in the art. The examples provided are merely representative are not intended to limit the invention, as defined in the appended claims, in any manner.

EXAMPLES

Examples 1-30

The purpose of Examples 1-30 was to determine the surface mount capability of different polyimide materials, per the Joint Electronic Device Engineering Council (JEDEC) standard test protocol described below.

The materials used in Examples 1-30 are shown below in Table 1.

TABLE 1

| | Monomers | Source, Vendor |
|---|---|---|
| Polyimide 1 | Bisphenol A dianhydride and m-phenylene diamine | SABIC INNOVATIVE PLASTICS* |
| Polyimide 2 | 3-chlorophthalic anhydride, bisphenol-A and diaminodiphenyl sulfone | SABIC INNOVATIVE PLASTICS* |
| Polyimide 3 | Oxydiphthalic anhydride and diaminodiphenyl sulfone | SABIC INNOVATIVE PLASTICS* |
| Polyimide 4 | 4,4-Bisphenol A dianhydride and diaminodiphenyl sulfone | SABIC INNOVATIVE PLASTICS* |
| Lexan SLX | Isophthalate terpahthalic acid and resorcinol copolymer | SABIC INNOVATIVE PLASTICS* |
| PEEK | Polyetherether ketone commercially available from Victrex as Victrex PEEK 150G | VICTREX** |
| PPSU | RADEL R | SOLVAY*** |

*Commercially sold by SABIC Innovative Plastic under the marks of ULTEM and EXTEM.
**Commercially sold by VICTREX under the generic name of polyetherketone (PEEK)
***Commercially sold by SOLVAY LLC under the trademark RADEL-R Lens Preparation Methods Samples in the form of lenses were made by injection molding the respective compositions. The lenses were molded into varying thickness from 0.1 mm-3.2 mm.

Testing Protocols

The lenses were subjected to lead free solder test temperature profile, according to IPC/JEDEC J-STD-202C entitled "Moisture/Reflow Sensitivity Classification for Non-hermetic Solid State Surface Mount Devices."

The molded samples in the form of lenses having varying thickness ranging from 0.1 mm to 3.2 mm were conditioned in a humidity chamber at 60° C./60 RH (Relative Humidity) for the specified number of hours shown in the tables. These samples were then mounted on a oven chamber simulating a lead free solder surface mount technology (SMT) process according to the IPC/JEDEC J-STD-202C thermal profile.

The transmission is measured at varying wavelengths using spectrophotometer. Transmission was measured at 850, 1310 and 1550 nm, respectively. A sample was deemed to pass the JEDEC standard protocol when the lens was transparent and dimensionally stable at a wall thickness of at least 0.1 millimeters to 5.0 millimeters and remains transparent and dimensionally stable (no distortion) after being (a) exposed to a precondition of 60° C./60% relative humidity for 120 hours and (b) then subjected to a lead free solder test having a peak temperature of 260° C. for up to 30 seconds.

For Examples 1-12, lenses were made using Polyimide 2 described in Table 1. The lenses were tested for their dimensional stability as described above. Results are also shown in the Tables 2-3.

TABLE 2

| | | Example No | | | | | |
|---|---|---|---|---|---|---|---|
| | | 1 | 2 | 3 | 4 | 5 | 6 |
| | | Sample | | | | | |
| | | Polyimide 2 | Polyimide 2 | Polyimide 2 | Polyimide 2 | Polyimide 2 | Polyimide 2 |
| Lead Free Solder Reflow | Thickness (mm) | 0.4 | 0.8 | 1.2 | 1.6 | 2 | 3.2 |
| | Conditions (RH/temp)* | Dry | Dry | Dry | Dry | Dry | Dry |

TABLE 2-continued

|  |  | Example No |  |  |  |  |  |
|---|---|---|---|---|---|---|---|
|  |  | 1 | 2 | 3 | 4 | 5 | 6 |
|  |  | Sample |  |  |  |  |  |
|  |  | Poly-imide 2 | Poly-imide 2 | Poly-imide 2 | Poly-imide 2 | Poly-imide 2 | Poly-imide 2 |
| Test | Peak temperature | 260 | 260 | 260 | 260 | 260 | 260 |
|  | Lead Free Solder Reflow Test Results | Pass | Pass | Pass | Pass | Pass | Pass |
| Transmission Test | Transmission at 850 nm, % | >72 | >72 | >72 | 69 | 68 | 50 |
|  | Transmission at 1310 nm, % | >85 | >85 | >85 | 83 | 82 | 77 |
|  | Transmission at 1550 nm, % | >85 | >85 | >85 | 83 | 82 | 77 |

*Conditioning temperature was 150° C.

TABLE 3

|  |  | Example No |  |  |  |  |  |
|---|---|---|---|---|---|---|---|
|  |  | 7 | 8 | 9 | 10 | 11 | 12 |
|  |  | Sample |  |  |  |  |  |
|  |  | Poly-imide 2 | Poly-imide 2 | Poly-imide 2 | Poly-imide 2 | Poly-imide 2 | Poly-imide 2 |
| Lead Free Solder Reflow Test | Thickness (mm) | 0.4 | 0.8 | 1.2 | 0.4 | 0.8 | 1.2 |
|  | conditions (RH/temp) | 60/60 | 60/60 | 60/60 | 85/85 | 85/85 | 85/85 |
|  | Peak temperature | 260 | 260 | 260 | 260 | 260 | 260 |
|  | Lead Free Solder Reflow Test Results | Pass | Pass | Pass | Pass | Pass | Pass |
| Transmission Test | Transmission at 850 nm, % | >72 | >72 | >72 | >72 | >72 | >72 |
|  | Transmission at 1310 nm, % | >85 | >85 | >85 | >85 | >85 | >85 |
|  | Transmission at 1550 nm, % | >85 | >85 | >85 | >85 | >85 | >85 |

Discussion of Examples 1-12

Our results showed that the lens passed the JEDEC protocol, namely that the lens was transparent and dimensionally stable at a wall thickness of at least 0.2 millimeters to 5 millimeters and remained transparent and dimensionally stable after being (a) exposed to a precondition of 60° C./60% relative humidity for 120 hours and (b) then subjected to a lead free solder test having a peak temperature of 260° C. for up to 30 seconds.

Examples 13-18

For Examples 13-18, lenses were made using Polyimide 3 described in Table 1. The lenses were tested for their dimensional stability as described above. Results are shown in the Table 4.

TABLE 4

|  |  | Example No |  |  |  |  |  |
|---|---|---|---|---|---|---|---|
|  |  | 13 | 14 | 15 | 16 | 17 | 18 |
|  |  | Sample |  |  |  |  |  |
|  |  | Poly-imide 3 | Poly-imide 3 | Poly-imide 3 | Poly-imide 3 | Poly-imide 3 | Poly-imide 3 |
| Lead Free Solder Reflow Test | Thickness (mm) | 1.6 | 2 | 3.2 | 1.6 | 2 | 3.2 |
|  | Conditions (RH/temp) | Dry* | Dry* | Dry* | 60/60 | 60/60 | 60/60 |
|  | Peak temperature | 260 | 260 | 260 | 260 | 260 | 260 |
|  | Lead Free Solder Reflow Test Results | Pass | Pass | Pass | Pass | Pass | Pass |

TABLE 4-continued

| | | Example No | | | | | |
|---|---|---|---|---|---|---|---|
| | | 13 | 14 | 15 | 16 | 17 | 18 |
| | | Sample | | | | | |
| | | Poly-imide 3 | Poly-imide 3 | Poly-imide 3 | Poly-imide 3 | Poly-imide 3 | Poly-imide 3 |
| Transmission Test | Transmission at 850 nm, % | >70 | 65 | 60 | >70 | 65 | 60 |
| | Transmission at 1310 nm, % | >82 | 81 | 81 | >82 | 81 | 81 |
| | Transmission at 1550 nm, % | >82 | 81 | 81 | >82 | 81 | 81 |

*Conditioning temperature was 150° C.

Discussion of Examples 13-18

Our results showed that the lens passed the JEDEC protocol—the lens was transparent and dimensionally stable at a wall thickness of at least 0.2 millimeters to 5.0 millimeters and remained transparent and dimensionally stable after being (a) exposed to a precondition of 60° C./60% relative humidity for 120 hours and (b) then subjected to a lead free solder test having a peak temperature of 260° C. for up to 30 seconds.

Examples 19-24

For Examples 19-24, lenses were made in accordance to the compositions indicated in Table 5. The lenses were tested for their dimensional stability as described above. Results are also shown in Table 5

Discussion of Examples 19-24

Our results showed that the lens passed the JEDEC protocol—lenses were transparent and dimensionally stable at a wall thickness of at least 0.2 millimeters to 5.0 millimeters and remains transparent and dimensionally stable after being (a) exposed to a precondition of 60° C./60% relative humidity for 120 hours and (b) then subjected to a lead free solder test having a peak temperature of 260° C. for up to 30 seconds.

Examples 25-33

For Examples 25-33, lenses were made using a blend of PEEK and Polyimide 2. The PEEK was present in an amount of 30 weight percent and Polyimide 2 was present in an amount of 70 weight percent, based on the total weight of the

TABLE 5

| | | Example No | | | | | |
|---|---|---|---|---|---|---|---|
| | | 19 | 20 | 21 | 22 | 23 | 24 |
| | | Sample | | | | | |
| | | Polyimide 3/ Polyimide 4 60/40 wt % | Polyimide 3/ Polyimide 4 60/40 wt % | Polyimide 3/ Polyimide 5 60/40 wt % | Polyimide 3/ Polyimide 4 60/40 wt % | Polyimide 3/ Polyimide 2 60/40 wt % | Polyimide 3/ Polyimide 2 60/40 wt % |
| Lead Free Solder Reflow Test | Thickness (mm) | 1.6 | 3.2 | 1.6 | 3.2 | 1.6 | 3.2 |
| | Conditions (RH/temp) | Dry* | Dry* | 60/60 | 60/60 | 60/60 | 60/60 |
| | Peak temperature | 260 | 260 | 260 | 260 | 260 | 260 |
| | Lead Free Solder Reflow Test Results | Pass | Pass | Pass | Pass | Pass | Pass |
| Transmission Test | Transmission at 850 nm, % | 76 | 66 | 76 | 66 | 66 | 55 |
| | Transmission at 1310 nm,% | 85 | 84 | 85 | 84 | 82 | 79 |
| | Transmission at 1550 nm, % | 84 | 82 | 84 | 82 | 82 | 79 |

*Conditioning temperature was 150° C.

composition. The lenses were tested for their dimensional stability as described above. Results are shown in Tables 6 and 7.

TABLE 6

|  |  | Example No |  |  |
|---|---|---|---|---|
|  |  | 25 | 26 | 27 |
|  |  | Sample | | |
|  |  | Polyimide 2/PEEK | Polyimide 2//PEEK | Polyimide 2//PEEK |
| Lead Free Solder Reflow Test | Thickness (mm) | 1.2 | 2 | 3.2 |
|  | Conditions (RH/temp) | Dry* | Dry* | Dry* |
|  | Peak temperature | 260 | 260 | 260 |
|  | Lead Free Solder Reflow Test Results | Fail | Fail | Fail |
| Transmission Test | Transmission at 850 nm, % | <5 | <5 | <5 |
|  | Transmission at 1310 nm, % | <5 | <5 | <5 |
|  | Transmission at 1550 nm, % | <5 | <5 | <5 |

*Conditioning temperature was 150° C.

TABLE 7

|  |  | Example No |  |  |  |  |  |
|---|---|---|---|---|---|---|---|
|  |  | 28 | 29 | 30 | 31 | 32 | 33 |
|  |  | Sample | | | | | |
|  |  | Polyimide 2//PEEK | Polyimide 2//PEEK | Polyimide 2//PEEK | Polyimide 2//PEEK | Polyimide 2//PEEK | Polyimide 2//PEEK |
| Lead Free Solder Reflow Test | Thickness (mm) | 1.2 | 2 | 3.2 | 1.2 | 2 | 3.2 |
|  | conditions (RH/temp) | 60/60 | 60/60 | 60/60 | 85/85 | 85/85 | 85/85 |
|  | Peak temperature | 260 | 260 | 260 | 260 | 260 | 260 |
|  | Lead Free Solder Reflow Test Results | Fail | Fail | Fail | Fail | Fail | Fail |
| Transmission Test | Transmission at 850 nm, % | <5 | <5 | <5 | <5 | <5 | <5 |
|  | Transmission at 1310 nm, % | <5 | <5 | <5 | <5 | <5 | <5 |
|  | Transmission at 1550 nm, % | <5 | <5 | <5 | <5 | <5 | <5 |

TABLE 8

|  |  | Example No |  |  |  |
|---|---|---|---|---|---|
|  |  | 34 | 35 | 36 | 37 |
|  |  | Sample | | | |
|  |  | Polyimide 1 | Polyimide 1 | Polyimide 1 | Polyimide 1 |
| Lead Free Solder Reflow Test | Thickness (mm) | 1.6 | 3.2 | 1.6 | 3.2 |
|  | conditions (RH/temp) | Dry* | Dry* | 60/60 | 60/60 |
|  | Peak temperature | 260 | 260 | 260 | 260 |
|  | Lead Free Solder Reflow Test Results | FAIL | FAIL | FAIL | FAIL |
| Transmission Test | Transmission at 850 nm, % | 86 | 67 | 86 | 67 |
|  | Transmission at 1310 nm, % | 88 | 87 | 88 | 87 |
|  | Transmission at 1550 nm, % | 87 | 85 | 87 | 85 |

*Conditioning temperature was 150° C.

Discussion of Examples 25-33

Our results showed that the lens comprising a blend of Polyimide 2 and PEEK did not pass the JEDEC protocol. The lens was not transparent initially and dimensionally stable at a wall thickness of at least 0.2 millimeters to 5.0 millimeters. Transmission decreased after being (a) exposed to a precondition of 60° C./60% relative humidity for 120 hours and (b) then subjected to a lead free solder test having a peak temperature of 260° C. for up to 30 seconds. The fact that the lens was not transparent, light could not transmit through the lens, thereby making the lens useless for optical connector applications.

Examples 34-37

For Examples 34-27, lenses were made Polyimide 1 described in Table 1. The lenses were tested for their dimensional stability as described above. Results are shown in Table 8.

Discussion of Examples 34-37

Inexplicably, the compositions containing Polyimide 1 did not result in compositions having useful properties. More particularly, results showed that lenses made from Polyimide 1 were not both transparent and dimensionally stable at a wall thickness of at least 0.2 millimeters to 5.0 millimeters and remain transparent and dimensionally stable after being (a) exposed to a precondition of 60° C./60% relative humidity for 120 hours and (b) then subjected to a lead free solder test having a peak temperature of 260° C. for up to 30 seconds.

Examples 38-41

For Examples 38-41, lenses were made using a polymer blend of Polyimide 1 and PPSU and Polyimide 2 and Lexan SLX. Polyimide was present in an amount of 60 weight percent and PPSU was present in an amount of 40 weight percent, based on the total weight of the composition. Polyimide 2 was present in an amount of 80 weight percent and Lexan SLX was present in an amount of 20 weight percent, based on the total weight of the composition. The lenses were tested for their dimensional stability as described above. Results are also shown in Table 9

TABLE 9

| | | Example No | | | |
|---|---|---|---|---|---|
| | | 38 | 39 | 40 | 41 |
| | | Sample | | | |
| | | Poly-imide 1/PPSU | Poly-imide 1/PPSU | Poly-imide 2/Lexan SLX | Poly-imide 2/Lexan SLX |
| Lead Free Solder Reflow Test | Thickness (mm) | 1.6 | 3.2 | 1.6 | 3.2 |
| | conditions (RH/temp) | 60/60 | 60/60 | 60/60 | 60/60 |
| | Peak temperature | 260 | 260 | 260 | 260 |
| | Lead Free Solder Reflow Test Results | FAIL | FAIL | FAIL | FAIL |
| Transmission Test | Transmission at 850 nm, % | 84 | 76 | 72 | 55 |
| | Transmission at 1310 nm, % | 87 | 84 | 84 | 80 |
| | Transmission at 1550 nm, % | 86 | 83 | 84 | 79 |

Examples 13-18

Our results showed that the lens comprising a blend of Polyimide 2 and PEEK does not pass the JEDEC protocol. Even though the lenses of these examples were transparent, the lenses were not dimensionally stable at a wall thickness of at least 0.2 millimeters to 5.0 millimeters and did not remain transparent and dimensionally stable after being (a) exposed to a precondition of 60° C./60% relative humidity for 120 hours and (b) then subjected to a lead free solder test having a peak temperature of 260° C. for up to 30 seconds.

Examples 42-44

For Examples 42-44, lenses were made using a blend of PEEK and Polyimide 2. The PEEK was present in an amount of 20 weight percent and Polyimide 2 was present in an amount of 80 weight percent, based on the total weight of the composition. The lenses were tested for their dimensional stability as described above. Results are also shown in Table 10.

TABLE 10

| | | Example No | | |
|---|---|---|---|---|
| | | 42 | 43 | 44 |
| | | Sample | | |
| | | Polyimide 2//PEEK | Polyimide 2//PEEK | Polyimide 2//PEEK |
| Lead Free Solder Reflow Test | Thickness (mm) | .4 | 8 | 1.2 |
| | conditions (RH/temp) | 60/60 | 60/60 | 60/60 |
| | Peak temperature | 260 | 260 | 260 |
| | Lead Free Solder Reflow Test Results | Fail | Fail | Fail |
| Transmission Test | Transmission at 850 nm, % | <10 | <5 | <10 |
| | Transmission at 1310 nm, % | <10 | <5 | <10 |
| | Transmission at 1550 nm, % | <10 | <10 | <10 |

Discussion of Examples 42-44

Our results showed that the lenses made from the compositions of Examples 42-44 did not pass the JEDEC protocol. The compositions were not transparent and dimensionally stable after being (a) exposed to a precondition of 60° C./60% relative humidity for 120 hours and (b) then subjected to a lead free solder test having a peak temperature of 260° C. for up to 30 seconds. Examples 42-44 also suggest that some amounts of polyketones may be present such that the lens passes the JEDEC protocol. As such, in some embodiments, lenses can further comprise less than 20 weight % of a polyketone.

While the invention has been described with reference to a several embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed:

1. An article comprising a lens having a width of 0.1 millimeters to 100 millimeters, a length of 0.5 millimeters to 500 millimeters, and a thickness of 0.2 millimeters to 5 millimeters; and the lens transmits light having a wavelength ranging from 600 nanometers to 1600 nanometers, wherein the lens comprises a polymer and the polymer comprises:
   a polyimide comprising structural units derived from
   (A) a dianhydride/diamine pair wherein the pair comprises
      (i) oxydiphthalic anhydride and diaminodiphenylsulfone, or
      (ii) a dianhydride selected from the group consisting of oxydiphthalic anhydride, 3,3, bisphenol A dianhydride, 4,4, bisphenol A dianhydride, and combinations of the foregoing dianhydrides and a diamine selected from the group consisting of meta-phenylenediamine, para-phenylenediamine, diaminodiphenyl sulfone, oxydianiline, and combinations of the foregoing diamines,
   (B) a chloro-substituted phthalic anhydride, a diamine selected from the group of meta-phenylenediamine, para-phenylenediamine, diaminodiphenyl sulfone, oxydianiline and combinations thereof, and a dihydroxy phenol salt, or
   (C) a combination selected from the group of (A) and (B); and
   wherein the lens is transparent and dimensionally stable at a wall thickness of at least 0.2 millimeters to 5.0 millimeters and remains transparent and dimensionally stable after being (a) exposed to a precondition of 60° C./60% relative humidity for 120 hours and (b) then subjected to a lead free solder test having a peak temperature of 260° C. for up to 30 seconds.

2. The article of claim 1, wherein the polyimide comprises structural units derived from oxydiphthalic anhydride and diaminodiphenyl sulfone.

3. The article of claim 1, wherein the polyimide comprises structural units derived from 3,3, bisphenol A dianhydride and diaminodiphenyl sulfone.

4. The article of claim 1, wherein the polyimide comprises structural units derived from oxydiphthalic anhydride and 4,4'-oxydianiline.

5. The article of claim 1, wherein the polyimide is a first polyimide polymer and the lens further comprises a second polyimide polymer, thereby forming a polymer blend, and the polymer blend is a non-delaminated polymer miscible polymer blend.

6. The article of claim 5, wherein the first polyimide polymer comprises structural units derived from oxydiphthalic anhydride and diaminodiphenyl sulfone; and the second polyimide polymer comprises structural units derived from a dianhydride/diamine pair selected from the group consisting of (i) 3,3 bisphenol dianhydride and diaminodiphenyl sulfone, (ii) 4,4, bisphenol A dianhydride and metaphenylene diamine, (iii) 4,4, bisphenol A dianhydride and para-phenylenediamine, (iv) 4,4 bisphenol dianhydride and diaminodiphenyl sulfone, and (v) combinations of the foregoing dianhydride/diamine pairs.

7. The article of claim 5, wherein the first polyimide polymer comprises structural units derived from 3,3 bisphenol dianhydride and diaminodiphenyl sulfone; and the second polyimide polymer comprises structural units derived from a dianhydride/diamine pair selected from the group consisting of (i) 4,4, bisphenol A dianhydride and metaphenylene diamine, (ii) 4,4, bisphenol A dianhydride and para-phenylenediamine, (iii) 4,4 bisphenol dianhydride and diaminodiphenyl sulfone, and (iv) combinations of the forgoing dianhydride/diamine pairs.

8. The article of claim 5, wherein
the first polyimide is present in an amount of 50 to 99 weight percent;
the second polyimide is present in an amount of 1 to 50 weight percent; and
the thermoplastic composition further comprises 0 to 70 weight percent of a component selected from the group consisting of fillers, reinforcements, additives, and combinations thereof;
wherein the first polyimide, the second polyimide, and the component are present at a total weight percent of 100.

9. The article of claim 1, wherein the composition further comprises at least one polymer that is not a polyimide.

10. The article of claim 9, wherein the at least one polymer is selected from the group consisting of polyesters, polyestercarbonates, polysulfones, polyether sulfones, polybenzimidizole, polyketones, and combinations of the foregoing polymers.

11. The article of claim 1, wherein the lens has a transparency that is greater than or equal to 60% at a thickness of 2 millimeters.

12. The article of claim 1, wherein the lens transmits light having a wavelength of 1310 nanometers.

13. The article of claim 1, wherein the lens transmits light having a wavelength of 1550 nanometers.

14. The article of claim 1, wherein the lens transmits light having a wavelength of 850 nanometers.

15. The lens of claim 1, wherein the polymer has a coefficient of thermal expansion of less than or equal to 100 ppm/° C. from 30° C. to 200° C. as measured by thermal mechanical analysis with a thermal ramp rate of 5° C./minute.

16. The lens of claim 1, wherein the polymer blend has a continuous use temperature greater than or equal to 150° C.

17. The lens of claim 1, wherein the lens is also transparent and dimensionally stable at a wall thickness of 0.2 millimeters to 5.0 millimeters after being (a) exposed to a precondition of 85° C./85% relative humidity for 120 hours and (b) subjected to a lead free solder test for 30 seconds at 260° C.

18. The article of claim 1 wherein the article is a component of an optical transreceiver.

19. The article of claim 5 wherein the article is component of an optical transreceiver.

20. The article of claim 1, wherein the lens further comprises less than 20 weight % of a polyketone, based on the total weight of the composition.

21. An article comprising a concave lens wherein the lens has a width of 0.1 millimeter to 100 millimeter, a length of 0.5 millimeter to 500 millimeters, and a thickness of 0.2 millimeter to 5 millimeter;
wherein the lens transmits light having a wavelength of 850 nanometers to 1550 nanometers wherein the lens comprises a polymer and the polymer comprises a polyimide comprising structural units derived from
(A) a dianhydride/diamine pair wherein the pair comprises
(i) oxydiphthalic anhydride and diaminodiphenylsulfone, or
(ii) a dianhydride selected from the group consisting of oxydiphthalic anhydride, 3,3, bisphenol A dianhydride, 4,4, bisphenol A dianhydride, and combinations of the foregoing dianhydrides and a diamine selected from the group consisting of meta-phenylenediamine, para-phenylenediamine, diaminodiphenyl sulfone, oxydianiline, and combinations of the foregoing diamines,
(B) a chloro-substituted phthalic anhydride, a diamine selected from the group consisting of meta-phenylenediamine, para-phenylenediamine, diaminodiphenyl sulfone, oxydianiline and combinations thereof, and a dihydroxy phenol salts, or
(C) a combination selected from the group of (A) and (B); and
wherein the lens is transparent and dimensionally stable at a wall thickness of at least 0.2 millimeters to 5.0 millimeters and remains transparent and dimensionally stable after being (a) exposed to a precondition of 60° C./60% relative humidity for 120 hours and (b) then subjected to a lead free solder test having a peak temperature of 260° C. for up to 30 seconds.

22. The article of claim 19, wherein the article is a component of an optical transceiver.

* * * * *